United States Patent Office 2,841,632
Patented July 1, 1958

2,841,632

ELECTROLYTE ADDITIVE FOR STORAGE BATTERIES

James F. Macholl, South Euclid, Ohio, and Kenneth Patterson, Wauwatosa, Wis., assignors to Gould-National Batteries, Inc., St. Paul, Minn.

No Drawing. Application June 4, 1956
Serial No. 588,949

5 Claims. (Cl. 136—153)

This invention relates generally to lead acid storage batteries, and more particularly to additives for prolonging the effective life of such batteries, wherein the electrolyte comprises a sulphuric acid solution of a specific gravity between 1.2 and 1.3.

This application is a continuation-in-part of application for Patent Serial No. 377,731, filed August 31, 1953, and Serial No. 406,077 filed January 25, 1954, both now abandoned. Those applications disclosed the addition of silver sulphate to the electrolyte of lead storage batteries to prolong the effective life thereof, the silver acting to prevent corrosion of the positive grids and preserve wood or other fibrous separators against deterioration.

The prevention of the corrosion of lead or lead-antimony positive grids in storage battery cells has long been a problem to the industry. While many have attacked the problem through improvement of the grid alloy itself, others have applied their efforts toward preserving the grids through the introduction of various chemical additives to the battery electrolyte.

Patent No. 1,826,724 to Booss and Chamberlain discloses the addition of cobalt sulphate or other cobalt salts in the amount of approximately .1% by weight of the electrolyte. Our experimentation in the addition of cobalt sulphate ($CoSO_4.7H_2O$) in small but varying percentages to sulphuric acid electrolytes reveals that the cobalt gives the positive grids excellent corrosion resistance. However, it is found that where separators of wood or other cellulose materials are used the batteries will suffer premature failure due to the inability of such separators to withstand the deteriorating effect of the cobalt.

Knowing that cobalt gives battery grids excellent corrosion resistance, the primary object of this invention is to provide a means and a method of using cobalt in lead acid storage batteries in sufficient concentration to lower the corrosion rate without causing a breakdown of separators of the type which are commonly attacked by the cobalt.

Another and more specific object of the invention is to provide a battery preservative for lead acid storage batteries using separators of wood or other cellulose material which is in the form of a chemical additive to the battery electrolyte and which will both provide a protective coating on the positive grid to prevent corrosion thereof and also have a beneficial effect upon the separators to preserve them against disintegration.

With these objects in mind, our invention broadly comprises the addition of cobalt sulphate ($CoSO_4.7H_2O$) and silver sulphate ($Ag_2SO_4$) in predetermined percentages to the battery electrolyte.

In the aforementioned applications for patent, Serial No. 377,731 and Serial No. 406,077, both now abandoned, of which this application is a continuation-in-part, the use of silver sulphate as a battery additive was fully disclosed. It is found that the silver not only acts to preserve the positive grids of batteries by forming a protective coating thereon but also prevents deterioration of wood or fiber separators used in the batteries. Tests indicated that under identical operating conditions such separators would retain their fiber strength in batteries to which silver sulphate had been added long after the separators in untreated batteries had become charred and weakened.

As heretofore mentioned, cobalt is an excellent corrosion inhibitor for positive grids and is, in fact, superior in this respect to silver. It has, however, been impossible to use cobalt in any form with wood or fiber separators due to is deteriorative effect upon them and resultant failure of the battery cells. Even microporous rubber separators break down under the cobalt attack to the extent that where such separators are used it is unsafe to use the cobalt in the percentages required to reduce the positive grid corrosion rate.

In our present invention we have been able to combine cobalt and silver in the electrolyte in such percentages as to retain only the preservative qualities of each. That is, experiments reveal that the cobalt and silver, though combined, will act independently of each other upon the separators. While the effectiveness of the cobalt in providing a protective coating on the positive plate is in no way diminished, but is actually increased, by the presence of the silver, the silver does appear to counteract and in fact overcome the deteriorative effect which the cobalt normally has upon separators of the fibrous type.

Various tests have been run on a group of identical batteries in order to determine the most desirable percentages of the sulphates to use. Cobalt sulphate was added to the battery electrolyte solutions in varying amounts up to 1.15 grams per liter of electrolyte. In the tests it was found that, while styrene, glass, plastic and like type separators will withstand cobalt concentrations up to the amounts stated; cedar, fir and other cellulose separators failed prematurely in an electrolyte with as low as .14 grams of cobalt sulphate per liter after only 4,500 to 5,700 ampere hours of overcharging. When silver sulphate was introduced in limited amounts to the electrolyte, such failure did not occur.

The range of .02 to 2.0 grams silver, disclosed in the aforementioned applications, is also applicable where the two sulphates are combined. When both sulphates are used within the limits stated they combine in providing a protective coating for the positive grids which is much more effective than either used alone in preventing the antimony from leaving the grids and depositing on the negative plates. Furthermore, the silver counteracts the effect of the cobalt on the separators and is particularly effective where the silver is present in greater quantity than is the cobalt.

While the two metals may be each introduced within the ranges described it will be understood that a primary function of the silver is to overcome the deteriorating effect which the cobalt has upon the separators. Accordingly, the percentage of silver sulphate should be increased or decreased as the cobalt sulphate addition is increased or decreased.

We have not as yet been able to determine the most proficient relative ratio between the silver and cobalt. It does appear, however, that cobalt sulphate is perhaps most economically effective when used at a strength of about .012% in the electrolyte or approximately .56 grams per liter of solution, any amounts in excess thereof not appreciably increasing corrosion resistance. When the cobalt is used at this strength the silver may be used with increasing effectiveness from about .02 grams per liter to 2.88 grams per liter.

As with other additives our combination additive may be added to batteries already in operation by withdrawing some of the electrolyte therefrom and dissolving the additive therein prior to returning the electrolyte to the battery. In the case of new batteries the additive may be dissolved in the electrolyte solution prior to its initial deposit in the battery cells.

While we have herein specifically described the introduction of cobalt and silver to the electrolyte as sulphates, we do not intend to exclude the possibility of adding them as nitrates, chlorides or in other compounds. The sulphates are preferred, however, due to the normal use of sulphuric acid in the battery electrolyte and the formation of lead sulphate during the discharge process.

Experiments reveal that batteries treated with our improved additive have an extended shelf life, have shown a reduction in antimony deposit from the positive to negative grid, have had reduced positive grid corrosion, and have retained stronger separator fiber strength as compared to untreated batteries subjected to equal usage. These are obviously all factors of extreme importance in prolonging the effective life of a storage battery. Furthermore, this particular additive can be used effectively regardless of the type of plate separators that are used in the battery.

We have accordingly provided an electrolyte additive for storage batteries which economically and effectively carries out the aforementioned objectives. It is understood that suitable modifications may be made in the invention as disclosed without departing from the spirit and scope of the appended claims. Having now therefore fully illustrated and described my invention, what we claim to be new and desire to protect by Letters Patent is:

1. In a storage battery, a cell, a liquid electrolyte in the cell comprising a sulphuric acid solution of a specific gravity between 1.2 and 1.3, positive and negative lead containing plates in the cell and immersed in the electrolyte, a separator of cellulose material between the plates and immersed in the electrolyte, and said sulphuric acid solution having dissolved therein cobalt sulphate in the percentage range of .001% to .020% by weight of cobalt per volume of acid and silver sulphate in the percentage range of .05% to .20% by weight of silver per volume of acid.

2. In a storage battery including positive and negative plates embodying lead in their structure and wherein said plates are immersed in an acid electrolyte comprising a sulphuric acid solution of a specific gravity between 1.2 and 1.3, a plate separator of cellulose material between the plates, said electrolyte having had added thereto from .72 to 2.88 grams of silver sulphate per liter of acid and from .05 to 1 gram of cobalt sulphate per liter of acid, there being however a greater quantity of the former than the latter.

3. In a storage battery, a cell, a liquid electrolyte contained in the cell and comprising a sulphuric acid solution of a specific gravity between 1.2 and 1.3, a positive plate and a negative plate immersed in the electrolyte, a wood separator separating the plates, said electrolyte also containing dissolved cobalt of approximately .012% per volume of liquid and dissolved silver in the range of .05% to .20% per volume of liquid.

4. In a storage battery including lead-containing grids immersed in an acid electrolyte, said electrolyte comprising essentially a sulphuric acid solution of a specific gravity between 1.2 and 1.3 and means for preventing corrosion of the grids comprising the combination with the electrolyte of cobalt sulphate and silver sulphate in such quantities as to provide from 500 up to about 2200 parts of silver and cobalt combined per million parts of the electrolyte.

5. In a storage battery including lead-containing grids and cellulosic plate separators immersed in an acid electrolyte, said electrolyte comprising a sulphuric acid solution of a specific gravity between 1.2 and 1.3 and means for preserving the grids and the separators which comprises in combination with the electrolyte cobalt sulphate in such amount as to provide in the percentage range of .001% to .020% cobalt per volume of electrolyte and silver sulphate from .75 grams up to 2.88 grams per liter of the electrolyte.

References Cited in the file of this patent
UNITED STATES PATENTS

| | | |
|---|---|---|
| 1,719,204 | Tefft | July 2, 1929 |
| 1,826,724 | Booss et al. | Oct. 13, 1931 |
| 2,649,766 | Johnson | Aug. 25, 1953 |